United States Patent [19]

Kohno et al.

[11] Patent Number: 5,335,174
[45] Date of Patent: Aug. 2, 1994

[54] CORRECTING METHOD FOR DATA USED FOR CONTROL OPERATION OF VEHICULAR CLUTCH

[75] Inventors: Hiromi Kohno; Hiroyuki Soda, Masuhiro Ohtsuka, Yusi Satdh; all

[73] Assignee: Zexel Corporation, Tokyo, Japan

[21] Appl. No.: 711,057

[22] Filed: Jun. 6, 1991

Related U.S. Application Data

[63] Continuation-in-part of Ser. No. 503,975, Apr. 4, 1990, Pat. No. 5,065,849.

[30] Foreign Application Priority Data

Jun. 11, 1990 [JP] Japan .................. 2-152189

[51] Int. Cl.⁵ ............... F16D 21/04; G06F 15/50
[52] U.S. Cl. ................ 364/424.1; 364/431.12; 192/0.075
[58] Field of Search ........... 364/424.01, 431.12; 74/866, 0.092, 0.084; 192/0.032, 0.075, 0.076, 0.052, 0.073; 902/4

[56] References Cited

U.S. PATENT DOCUMENTS

| | | | |
|---|---|---|---|
| 4,348,729 | 9/1982 | Sasayama et al. | 364/431.12 |
| 4,662,491 | 5/1987 | Takefuta et al. | 192/0.072 |
| 4,730,256 | 3/1988 | Niimi et al. | 364/431.12 |
| 4,751,633 | 6/1988 | Henn et al. | 364/431.12 |
| 4,829,166 | 9/1989 | Froelich | 902/4 |
| 4,977,992 | 12/1990 | Ohtsuka et al. | 192/0.073 |
| 5,029,678 | 7/1991 | Koshizawa | 192/0.076 |
| 5,060,158 | 10/1991 | Kono et al. | 364/424.1 |
| 5,065,849 | 11/1991 | Kono et al. | 192/0.076 |
| 5,065,851 | 11/1991 | Otsuka et al. | 192/103 R |
| 5,095,774 | 3/1992 | Takahashi et al. | 364/424.1 |

FOREIGN PATENT DOCUMENTS

2-80821 3/1990 Japan .

*Primary Examiner*—Thomas G. Black
*Assistant Examiner*—Tan Q. Nguyen
*Attorney, Agent, or Firm*—Pollock, Vande Sande & Priddy

[57] ABSTRACT

In a method for correcting clutch data used for controlling the operation of a friction clutch connected with an electronically controlled transmission system, the clutch data includes meet position data stored in a memory and the stored meet position data is compared with a first learned meet position data obtained after power is applied to the transmission system. The old data stored in the memory is replaced with the first learned meet position data when the difference between the old data and the first learned meet position data is greater than a prescribed value. The old data is corrected by the use of the old data and the learned data when the difference is not greater than the prescribed value even if the learned data is the first learned meet position data.

9 Claims, 3 Drawing Sheets

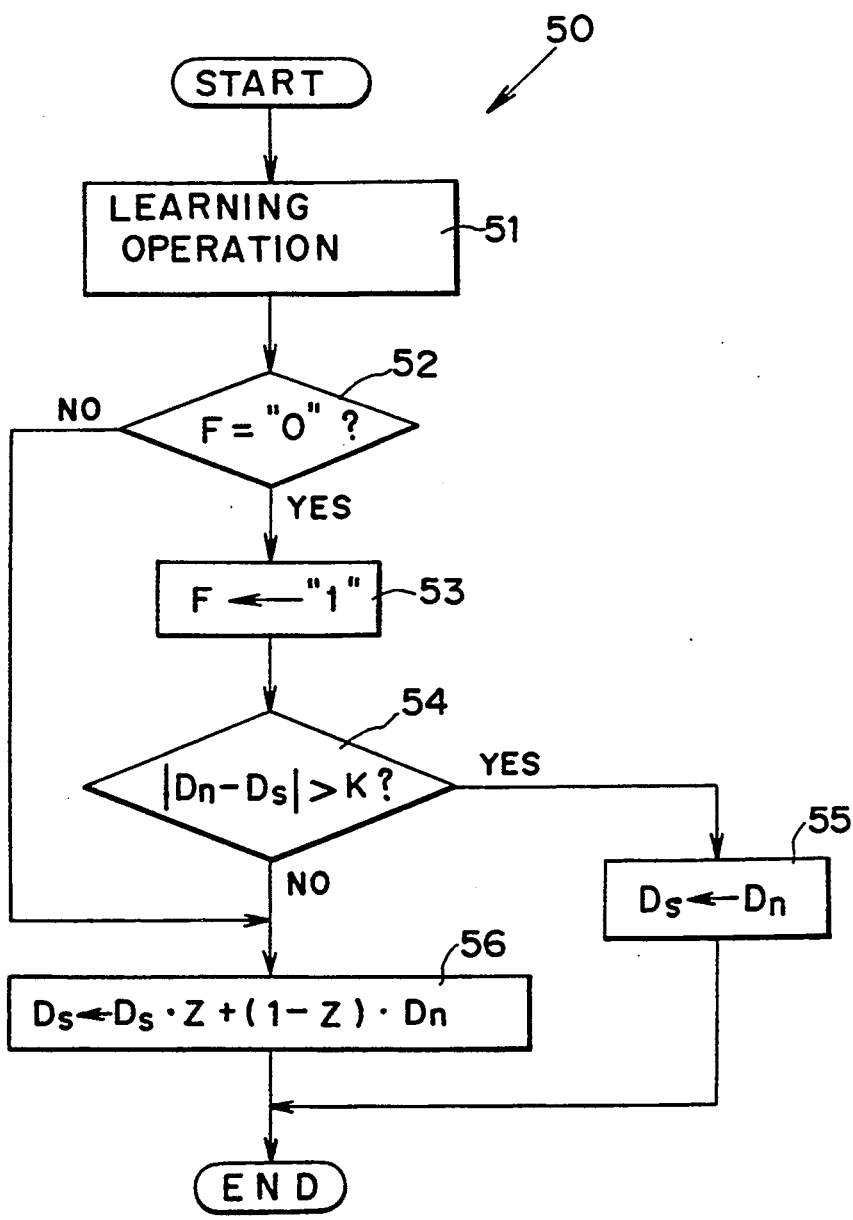

CORRECTING METHOD FOR DATA USED FOR CONTROL OPERATION OF VEHICULAR CLUTCH

RELATED APPLICATIONS

This application is a continuation-in-part of U.S. patent application Ser. No. 07/503,975 filed Apr. 4, 1990, now U.S. Pat. No. 5,065,849.

BACKGROUND OF THE INVENTION

1. Field of the Invention

The present invention relates to a method for correcting data used for controlling the operation of a vehicular clutch, and more particularly to a method for correcting learned data for clutch control operation.

2. Description of the Prior Art

In the prior art there has been widely used a clutch control system for controlling the operation of a friction type clutch in which the clutch is coupled with an actuator and the amount of operation of the clutch is controlled by the actuator in accordance with an electric control signal generated by a control unit. The clutch control system of this type is employed in, for example, a vehicle automatic transmission system. In the case where the operation of the clutch is controlled by the use of the clutch control system of this type, precise clutch data corresponding to the relationship between the position of a member for operating the clutch and the amount of operation of the clutch is required to ensure appropriate clutch control operation. However, variation in this relationship arises because of variation in manufacture, and also with the passage of time due to the wear of the clutch disc and the like.

Accordingly, if precise control of the clutch is required, it is necessary to carry out appropriate correction of the clutch data representing the relationship by, for example, a learning operation. In the prior art, for correcting such clutch data, the meet position of the clutch pressure plate, at which the rotation of the input shaft of the transmission starts because of the transmission of torque through the clutch owing to the meeting between the pressure plate and the associated clutch disk, is determined by a learning operation which is, for example, conducted each time the selector is set to its neutral (N) position, and the clutch data necessary for controlling the clutch is corrected by the use of the resulting learned data to obtain the corrected or updated clutch data.

In general, in the case where the clutch data is corrected on the basis of the learned data as described above, the newly obtained learned data is not directly used for the correction as it is. Instead, the clutch data is corrected by the use of up-dated data obtained by processing the newly obtained learned data in accordance with, for example, the moving-average method, so that even if the learned data includes a large degree of error, the error is not directly reflected in the correction of the clutch data.

However, the foregoing conventional method has a disadvantage in that the correction value is determined by taking into account the learned data obtained previously even if the newly obtained learned data represents precisely the data required for the correction of the clutch data, as may be the case, for example, following the adjustment or replacement of the link mechanism between the clutch and the associated actuator. In such circumstances faulty data correction is first carried out and then the clutch data is gradually corrected so as to approach to the appropriate value. Accordingly, in this case, improper clutch data is provided for controlling the operation of the clutch for a long time and the clutch is not controlled properly until the clutch data reaches the appropriate data.

SUMMARY OF THE INVENTION

It is an object of the present invention to provide an improved method for correcting data used for controlling a vehicular clutch, which is capable of overcoming the foregoing drawbacks.

It is another object of the present invention to provide a method for correcting data, which is capable of correcting the clutch data properly in the case where the learned value of the meet position data of the clutch varies greatly.

According to the present invention, in a method for correcting clutch data including meet position data, which is stored in a memory and is used for controlling the operation of a vehicular friction type clutch connected with an internal combustion engine for powering a vehicle with an electronically controlled transmission system, the method comprises steps of: carrying out a learning operation to obtain learned meet position data representing the current meet position of the clutch; discriminating whether or not the learned meet position data obtained in the learning operation step is the first learned meet position data obtained after power is applied to the electronically controlled transmission system; and updating the data stored in the memory by replacing it with said first learned meet position data when the difference between said first learned meet position data and the meet position data stored in the memory is greater than a prescribed value.

Thus, the first learned meet position data obtained after power on of the transmission system is compared with the meet position data stored in the memory at that time. In the case where the difference in magnitude between the first learned meet position data and the meet position data stored in the memory at that time is greater than the prescribed value, the first learned meet position data is stored as up-dated meet position data in the memory without modification and replaces the meet position data stored therein up to that time. As a result, the learned meet position data newly stored in the memory is used for controlling the clutch until the next updating operation is carried out. On the other hand, in the case where the difference between the first learned meet position data obtained after power-on of the transmission system and the meet position data stored in the memory is not greater than the prescribed value, the up-dated meet position data to be stored in the memory at this time is determined by, for example, a calculation on the basis of the learned meet position data and the meet position data stored in the memory, in a conventional manner. In the case of learned meet position data obtained subsequent to the first learned meet position data obtained after power-on of the transmission system, the up-dated meet position data to be stored in the memory is determined on the basis of the new learned meet position data and the meet position data previously stored in the memory in a conventional manner.

The invention will be better understood and other objects and advantages thereof will be more apparent from the following detailed description of preferred embodiments with reference to the accompanying drawings.

BRIEF EXPLANATION OF THE DRAWINGS

FIG. 5 is a flowchart showing a correction program for correcting the meet position data, which is executed in the apparatus shown in FIG. 1.

DESCRIPTION OF THE PREFERRED EMBODIMENT

Figure 1:
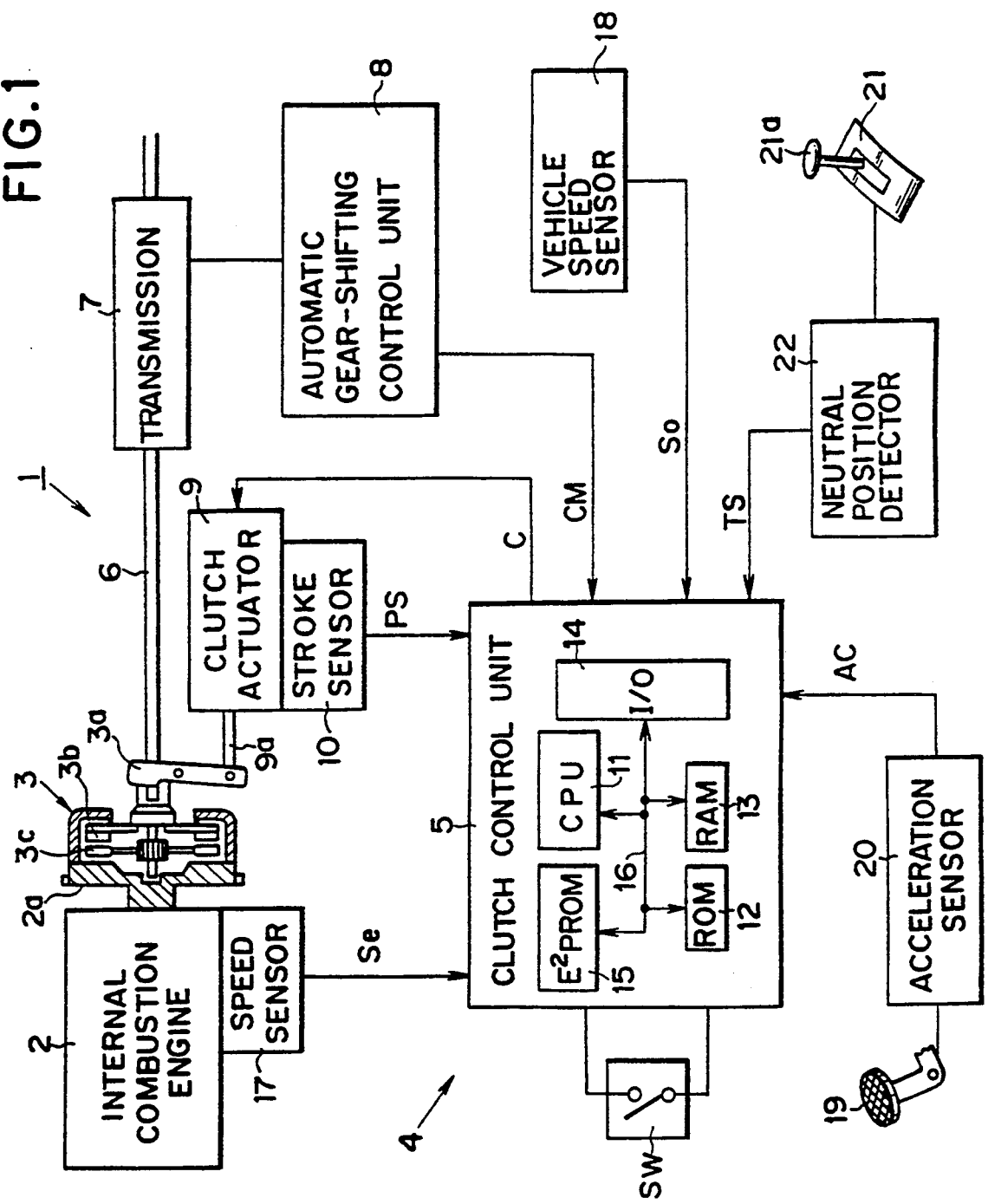
FIG. 1 is a schematic view illustrating an embodiment of a vehicle transmission control system including a clutch control system in which clutch data concerning a friction type clutch is corrected in accordance with the present invention.

FIG. 1 schematically shows an embodiment of a vehicle transmission control system including a clutch controlling system in which clutch data concerning a friction type clutch is corrected according to the method of the present invention. Reference numeral 1 generally designates a vehicle transmission control system for a vehicle (not shown) powered by an internal combustion engine 2, and a friction clutch 3 is mounted on an engine flywheel 2a. The friction clutch 3 is a well-known dry-type single-disc clutch having a clutch release lever 3a, a pressure plate 3b and a clutch disc 3c, and is controlled by a clutch control system 4 including a clutch control unit 5. The clutch 3 is connected by a connecting rod 6 with a gear transmission 7, which is associated with an automatic gear-shifting control unit 8 to form a conventional automatic gear-shifting control system.

In order to control the engaging/disengaging (ON-/OFF) operation of the clutch 3 in response to an electric signal, the clutch control system 4 has a clutch actuator 9 having a piston rod 9a connected with the clutch release lever 3a, and the clutch actuator 9 is responsive to a control signal C generated by the clutch control unit 5 to control the position of the pressure plate 3b, whereby the amount of operation of the clutch 3 can be controlled.

For detecting how the clutch 3 is being operated at each moment, in other words, for detecting the operation condition of the clutch 3, a stroke sensor 10 is coupled with the clutch actuator 9 to detect the operation position of the release lever 3a of the clutch 3 and a position signal PS indicating the operation position of the release lever 3a is produced by the stroke sensor 10. Since the position of the pressure plate 3b, on which the operation condition of the clutch 3 depends, has a predetermined relation with the operation position of the release lever 3a, it follows that the position signal PS from the stroke sensor 10 indicates the position P of the pressure plate 3b.

The position signal PS is supplied to the clutch control unit 5 which includes a central processing unit (CPU) 11, read-only memory (ROM) 12, random access memory (RAM) 13, I/O interface 14 and an electrically erasable programmable read-only memory ($E^2$ PROM) 15, which are interconnected by a bus 16 to form a conventional microcomputer system.

Reference symbol SW designates a power switch of the vehicle transmission control system 1 shown in FIG. 1 and the power is applied to the vehicle transmission control system 1 when the switch SW is turned on.

Associated with the internal combustion engine 2 is a speed sensor 17, which is a sensor of well-known design for detecting the input rotational speed N of the clutch 3 and producing a first speed signal Se indicating this speed. A vehicle speed sensor 18, which is a conventional sensor for detecting the running speed of the vehicle, produces a second speed signal So showing the vehicle running speed. The first and second speed signals Se and So are supplied to the clutch control unit 5 to which an acceleration signal AC indicating the amount of operation of an accelerator pedal 20 is further applied from an acceleration sensor 20 for detecting the amount of operation of the accelerator pedal 19.

Data corresponding to the designed-in relationship between the position P of the pressure plate 3b indicated by the position signal PS and the operation condition of the clutch 3 is stored in the ROM 12 as initial clutch data. The initial clutch data includes first data showing an OFF position $P_1$ of the clutch 3 at which the pressure plate 3b is maximally apart from the clutch disc 3c and the clutch 3 is in its fully disengaged state, second data showing a meet position $P_2(>P_1)$ of the clutch 3 which is a position of the pressure plate 3b at which the input shaft of the transmission 7 begins to rotate owing to the fact that the operation of the clutch 3 changes from its disconnected state to its semi-engaged state to cause torque transmitting operation, third data showing a finish position $P_3(>P_2)$ of the clutch 3 which is a boundary position between the semi-engaged state and the engaged state of the clutch 3, and fourth data showing an ON position $P_4(>P_3)$ at which the pressure plate 3b maximally pushes the clutch disc 3c to obtain the fully engaged state of the clutch 3.

Figure 2:
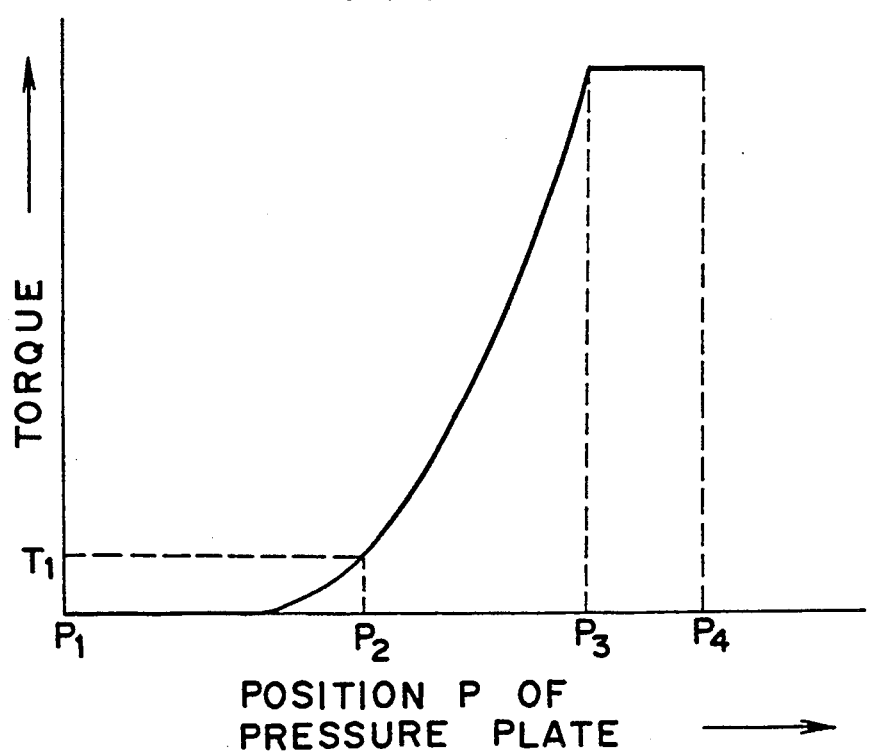
FIG. 2 is a graph showing the relationship between the position of the pressure plate of the clutch shown in FIG. 1 and the torque transmitted through the clutch.

FIG. 2 shows the relationship based on the initial clutch data between the position P of the pressure plate 3b of the clutch 3 and the torque transmitted therethrough.

The initial clutch data stored in the ROM 12 is transferred to the RAM 13 in response to the supply of power to the clutch control unit 5, and the initial clutch data is stored in the RAM 13 as clutch data used for controlling the clutch 3. The clutch control unit 5 is responsive to a command signal CM from the automatic gear-shifting control unit 8, and produces the control signal C for controlling the clutch 3 with reference to the clutch data stored in the RAM 13 and the position signal PS so as to obtain the desired operation condition of the clutch 3 in accordance with the command signal CM. In this embodiment, the command signal CM is for commanding the start time of the operation for engaging/disengaging the clutch 3 in order to carry out automatic gear-shifting operation of the transmission 7.

Since the relationship between the position P of the pressure plate 3b indicated by the position signal PS and the operation condition of the clutch 3 (the torque transmitted through the clutch 3) varies due to, for example, wear of various portions of the clutch 3 with the passage of time, for assuring precise control of the clutch 3, it is necessary to correct the clutch data at appropriate time intervals. For this purpose, the clutch control system 4 shown in FIG. 1 has a neutral position detector 22 coupled with a gear selector 21 having a selecting lever 21a, and a learning timing signal TS is generated by the neutral position detector 20 each time the selecting lever 21a is positioned at its neutral (N) position. The learning timing signal TS is applied to the clutch control unit 5 and a predetermined learning operation for detecting the actual meet position is carried out for predetermined conditions by the clutch control unit 5 to obtain learned data Dn showing the resulting learned meet position.

The last meet position data Ds used for the preceding control operation is stored in the $E^2$ PROM 15 and the up-dated meet position data is determined on the basis of the data Ds by taking into account the learned data Dn obtained in accordance with programs stored in the ROM 12 in advance. The updating operation of the meet position data Ds is carried out by a learning operation in accordance with a correction program for updating the meet position data, which is stored in the ROM 12 in advance and is executed in the microcomputer in the clutch control unit 5.

Figure 3:
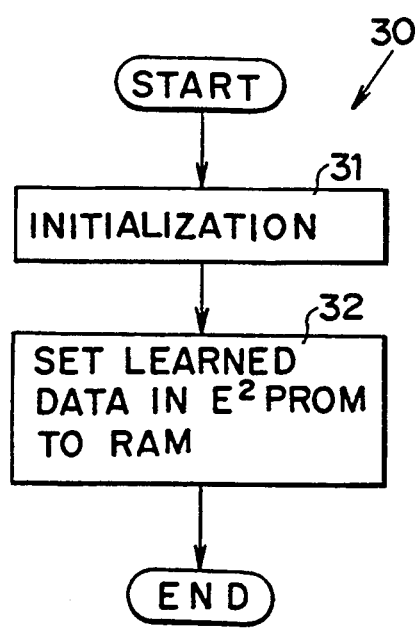
FIG. 3 is a flowchart of a first processing program executed in the apparatus shown in FIG. 1.
Figure 4:
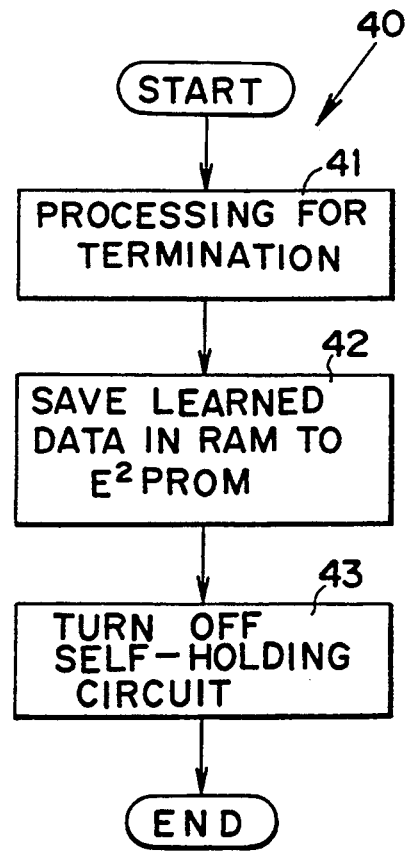
FIG. 4 is a flowchart of a second processing program executed in the apparatus shown in FIG. 1.

Description will be now given to the processing operation executed in the clutch control unit 5, in which the meet position data is up-dated by the use of the learned data representing the actual meet position of the clutch 3 by the learning operation in accordance with the present invention, with reference to FIGS. 3 to 5.

FIG. 3 is the flowchart showing a first processing program 30 used for setting the data stored in the $E^2$ PROM 15 to the RAM 13, FIG. 4 is the flowchart showing a second processing program 40 used for storing the learned data in the RAM 13 into the $E^2$ PROM 15 at the time the system control operation is terminated, and FIG. 5 is the flowchart showing a correction program 50 used for correcting or updating the meet position data by the use of the learned data showing the actual meet position of the clutch 3.

When the power is supplied to the vehicle transmission control system 1 including the clutch control system 4 upon the closing of the switch SW, the execution of the first processing program 30 starts with system initialization in step 31. Then, the operation moves to step 32, in which the last meet position data Ds used for the control operation carried out before the switch SW was closed is read out from the $E^2$ PROM 15 and the last meet position data Ds is set at a designated address of the RAM 13. Thus, the system is made ready for updating the meet position data by the use of the learned data, and the execution of the first processing program 30 is completed.

The correction program 50 is adapted to be executed each time the learning timing signal TS is applied to the clutch control unit 5. After the start of the execution of the correction program 50, the operation moves to step 51 in which the learning operation for obtaining the current meet position is carried out by producing the control signal C so as to cause the clutch 3 to operate and then detecting the current meet position of the clutch 3 during its operation. Thus, the current meet position is determined in a conventional manner on the basis of the first speed signal Se and the position signal PS, which are supplied to the clutch control unit 5 at that time. As a result, learned data Dn representing the current meet position is obtained. The learned data Dn shows the actual position $P_2$ at this time.

Then, the operation moves to step 52 in which discrimination is made as to whether or not a flag F is cleared. Since the flag F is cleared upon the power-on operation for the vehicle transmission control system 1, the determination in step 52 will be YES if the discrimination in step 52 is the first execution after power-on.

The operation moves to step 53 when the determination in step 52 is YES, and the flag F is set in step 53. In the subsequent step 54 the learned data Dn obtained in step 51 is compared in magnitude with the meet position data Ds, which shows the meet position used for controlling the clutch operation in the preceding control operation and is set into the RAM 13 in step 32 of the first processing program 30.

When the difference between Dn and Ds is greater than a prescribed value K, the operation moves to step 55, in which the learned data Dn obtained during the execution of this program cycle is stored in the RAM 13 as up-dated meet position data Ds instead of the last meet position data Ds obtained in the preceding processing operation. On the other hand, when the difference between Dn and Ds is equal to or smaller than K, the determination in step 54 becomes NO and the operation moves to step 56, in which the up-dated meet position data Ds to be stored in the RAM 13 in place of the last meet position data Ds is calculated in accordance with the following formula:

$$Ds \cdot Z + (1-Z) Dn \qquad (1)$$

Wherein Z is smaller than 1.

The resulting meet position data calculated in accordance with the formula (1) is stored in the RAM 13 as the up-dated meet position data Ds. Thus, the execution of the correction program 50 is completed at this time.

As will be understood from the foregoing description, when the flag F has been once set in step 53, the step 56 is always executed for updating the meet position data Ds in accordance with the formula (1) in the subsequent program cycles, that is, in each program cycle other than the first program cycle.

The execution of the second processing program 40 starts in response to the turning off of the switch SW and the operation moves to step 41 in which a processing operation for terminating the control operation is executed. Then, in step 42 the up-dated meet position data Ds stored in the RAM 13 is transferred into the $E^2$ PROM 15 to save the same. After this, the self-holding circuit (not shown) is turned off in step 43, whereafter it stands by for the next turn-on of the switch SW.

According to the arrangement described above, in the case of the first learning operation after turn-on of the switch SW, the last meet position data Ds used in the preceding control operation is compared with the learned data Dn obtained in the first learning operation and if the difference therebetween is greater than a prescribed value, the learned data Dn is stored, without modification, as the updated meet position data Ds in the RAM 13. Consequently, in the case where the meet position data has changed greatly due to the adjustment or replacement of the link mechanism in the actuating system of the clutch 3, or the replacement of a sensor or the like, up-dated meet position data properly representing the current meet position of the clutch is detected by the learning operation in the subsequent control operation of the vehicle transmission control system 1, and the meet position data Ds is changed to the correct meet position data obtained in the first learning operation after turn-on of the switch SW. On the other hand, regarding changes in the meet position data occurring during the control operation after the first learning operation, the meet position data is not changed by a large degree but is changed taking account of the meet position data Ds used in the preceding control operation in the conventional manner according to the formula (1). Thus stable clutch control operation can be realized even when a faulty learning operation occurs because the meet position data is not changed directly on the basis of the result of the learning operation for detecting the meet position of the clutch.

In the foregoing cases, the value of Z can be determined experimentally or on the basis of an appropriate standard.

What is claimed is:

1. A method for correcting clutch data including stored meet position data, which is stored in a memory and is used for controlling actuator means for operating a vehicular friction type clutch connected with an internal combustion engine for powering a vehicle with an electronically controlled transmission system, said method comprising steps of:

carrying out a learning operation to obtain learned meet position data representing a learned meet position of the clutch;

discriminating whether or not the learned meet position data obtained in said learning operation step is first learned meet position data obtained by the first learning operation carried out after power is applied to the electronically controlled transmission system; and, updating the stored meet position data stored in the memory by replacing it with said first learned meet position data when a difference between said first learned meet position data and the stored meet position data stored in the memory is greater than a prescribed value representing a predetermined change in a sensed position of said actuator means.

2. A method as claimed in claim 1, wherein said steps are carried out by the execution of a computer program in a microcomputer.

3. A method as claimed in claim 2, wherein the microcomputer has a random access memory, a read-only memory and an electrically erasable programmable read-only memory, and the computer program is stored in the read-only memory.

4. A method as claimed in claim 3, wherein the clutch data is stored in the electrically erasable programmable read-only memory and is transferred from the electrically erasable programmable read-only memory to the random access memory just after activation of the program such that the updated clutch data is stored in the random access memory during the execution of the program.

5. A method as claimed in claim 4, wherein the updated clutch data stored in the random access memory is transferred to the electrically erasable programmable read-only memory to save the up-dated clutch data at the time of the termination of the control operation of the transmission control system.

6. A method as claimed in claim 1, wherein the updating operation is carried out at appropriate time intervals.

7. A method as claimed in claim 1, wherein the updating operation is carried out each time a gear selector is set to a neutral position.

8. A method as claimed in claim 2, wherein the updating operation is carried out at appropriate time intervals.

9. A method as claimed in claim 2, wherein the updating operation is carried out each time a gear selector is set to a neutral position.

* * * * *

UNITED STATES PATENT AND TRADEMARK OFFICE
CERTIFICATE OF CORRECTION

PATENT NO. : 5,335,174
DATED : August 2, 1994
INVENTOR(S) : HIROMI KOHNO, et al.

It is certified that error appears in the above-indentified patent and that said Letters Patent is hereby corrected as shown below:

On the title page, section [75], line 2, after "Ohtsuka," change "Yusi Satdh" to --Yuji Satoh--, and after "all" insert --of Higashimatsuyama, Japan--.

Signed and Sealed this

Fourth Day of October, 1994

Attest:

BRUCE LEHMAN

*Attesting Officer*   *Commissioner of Patents and Trademarks*